J. H. HAMMILL.
CATTLE GUARD.
APPLICATION FILED OCT. 6, 1908.
923,512.
Patented June 1, 1909.
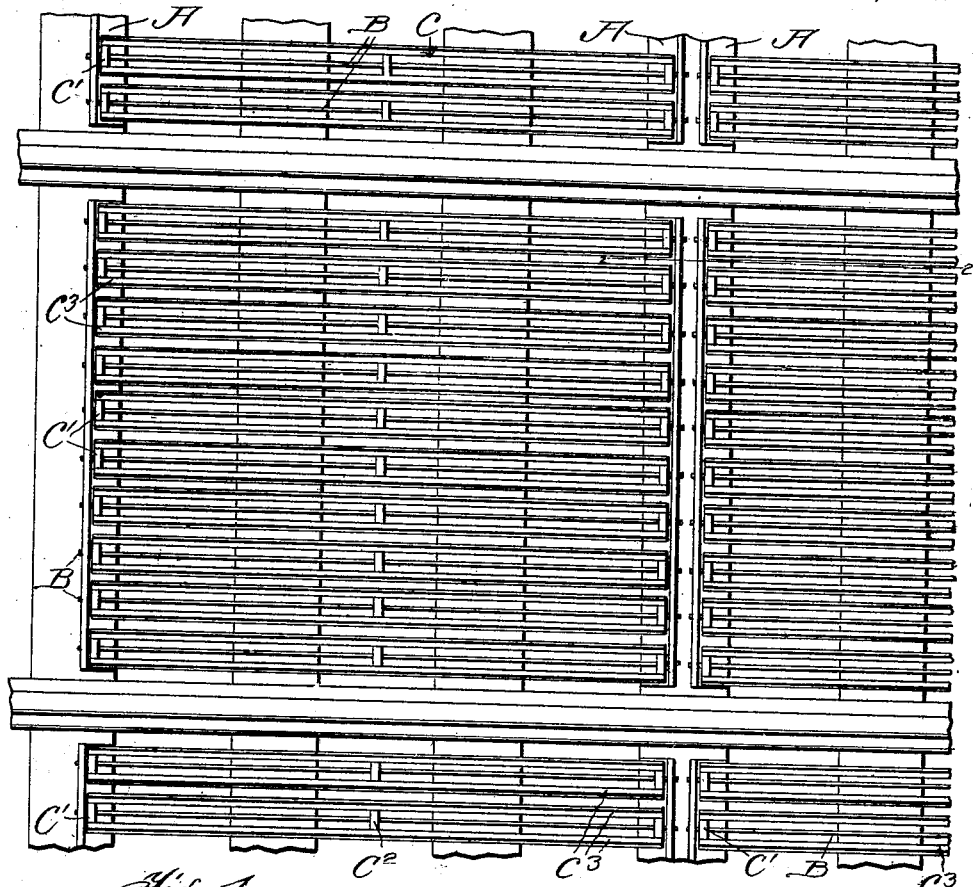
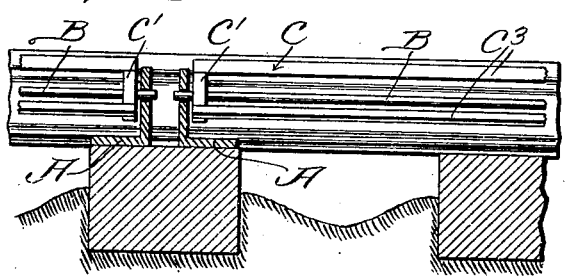
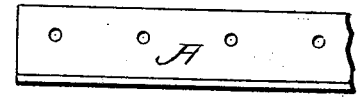
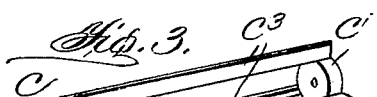

UNITED STATES PATENT OFFICE.

JOHN H. HAMMILL, OF CEDAR RAPIDS, IOWA, ASSIGNOR OF ONE-TWENTIETH TO CHARLES P. MURRAY AND FIFTY-ONE ONE-HUNDREDTHS TO ANDREW DUGANE, BOTH OF CEDAR RAPIDS, IOWA.

CATTLE-GUARD.

No. 923,512.  Specification of Letters Patent.  Patented June 1, 1909.

Application filed October 6, 1908. Serial No. 456,451.

*To all whom it may concern:*

Be it known that I, JOHN H. HAMMILL, a citizen of the United States, residing at Cedar Rapids, in the county of Linn and State of Iowa, have invented a new and useful Improvement in Cattle-Guards, of which the following is a specification.

This invention relates to certain new and useful improvements in cattle guards for preventing cattle from passing along the rail-road track from one field to another, the object being to provide a guard which is exceedingly simple and cheap in construction, and one which can be readily placed in position.

A further object of the invention is to provide a guard which is composed of a plurality of revoluble members so mounted that when the cattle step upon the same, they will revolve.

A still further object of the invention is to provide novel revoluble members which are exceedingly simple and cheap in construction and which is so mounted that they are not likely to get out of order in use.

With these and other objects in view, the invention consists in the novel features of construction, combination and arrangement of parts hereinafter fully described and pointed out in the claim.

In the drawing forming a part of this specification:—Figure 1 is a top plan view of my improved guard showing it arranged in position on the track. Fig. 2 is a section taken on line 2—2 of Fig. 1. Fig. 3 is a perspective view of one of the guard-members detached, and Fig. 4 is a side elevation of one of the angled-irons.

In carrying out my improved invention I employ angled-irons A which are secured on the ties between the rails and to each side, as clearly shown, and if desired two sets of these irons can be used so as to form a guard of a greater width. The angled irons are secured to the ties by spikes or screws about five feet apart, and are provided with a plurality of spaced openings in which are mounted rods B on which are revolubly mounted guard-members C. These guard-members are preferably formed of end-disks $C'$ and central disks $C^2$ connected together by strips $C^3$ which extend outwardly beyond the periphery of the disk as clearly shown.

It will be seen that when the guard is placed in position on the track and an animal attempts to pass over the same, the members will revolve as they are struck by the foot so that it will be impossible for the animal to walk.

In the drawing I have shown a revoluble guard-member arranged parallel with the rails of the track, but it is of course understood that they can be arranged cross-wise of the track, if desired, and the same result obtained.

It is of course understood that a space will be left to each side of the rail, so that the guard will not interfere with the wheels of the train as it passes over the same, and it is understood that the angled irons are of a sufficient height so as to hold the revoluble guard-members above the ties, so as to allow the same to rotate freely.

From the foregoing description it will be seen that I have provided a cattle guard which is composed of a very few parts which are so connected together that they can be readily placed into position on the railroad track.

Having thus fully described my invention, what I claim as new and desire to secure by Letters Patent is:—

A cattle guard comprising angled irons adapted to be secured to ties between and to each side of the rail, said angled irons being provided with a series of openings, rods mounted in said angled irons, guard members revolubly mounted on said rod, said guard members comprising spaced disks connected together by strips which are secured on the periphery of the disks edgewise.

JOHN H. HAMMILL.

Witnesses:
G. ROOT,
W. A. REYNOLDS.